G. B. MULLEN.
TIRE GAGE ATTACHMENT.
APPLICATION FILED DEC. 19, 1917.

1,278,720.

Patented Sept. 10, 1918.

WITNESSES
Edw. Thorpe
C. Bradway

INVENTOR
George B. Mullen
BY

ATTORNEYS

UNITED STATES PATENT OFFICE.

GEORGE B. MULLEN, OF NEW YORK, N. Y.

TIRE-GAGE ATTACHMENT.

1,278,720.  Specification of Letters Patent.  Patented Sept. 10, 1918.

Application filed December 19, 1917. Serial No. 207,881.

*To all whom it may concern:*

Be it known that I, GEORGE B. MULLEN, a citizen of the United States, and a resident of the city of New York, Whitestone, borough of Queens, in the county of Queens and State of New York, have invented a new and Improved Tire-Gage Attachment, of which the following is a full, clear, and exact description.

This invention relates to pneumatic tire gages and it relates more particularly to an attachment whereby an ordinary pocket gage can be attached to a valve stem and normally carried by the wheel so as to be available for use at all times for ascertaining the pressure of the air within the tire.

The invention has for its general objects to provide a comparatively simple and inexpensive attachment so designed that a pressure gage can be applied to any valve stem in such relation thereto that by pressing the gage against the valve in the stem the pressure of the air in the tire can be registered by the gage, the attachment being removable, together with the gage, whenever it is desired to supply air to the tire, it being necessary in applying the attachment to remove the usual screw cap on the end of the valve stem, and the attachment and gage serve to cover the stem.

With such objects in view, and others which will appear as the description proceeds, the invention comprises various novel features of construction and arrangement of parts which will be set forth with particularity in the following description and claim appended hereto.

Figure 1:
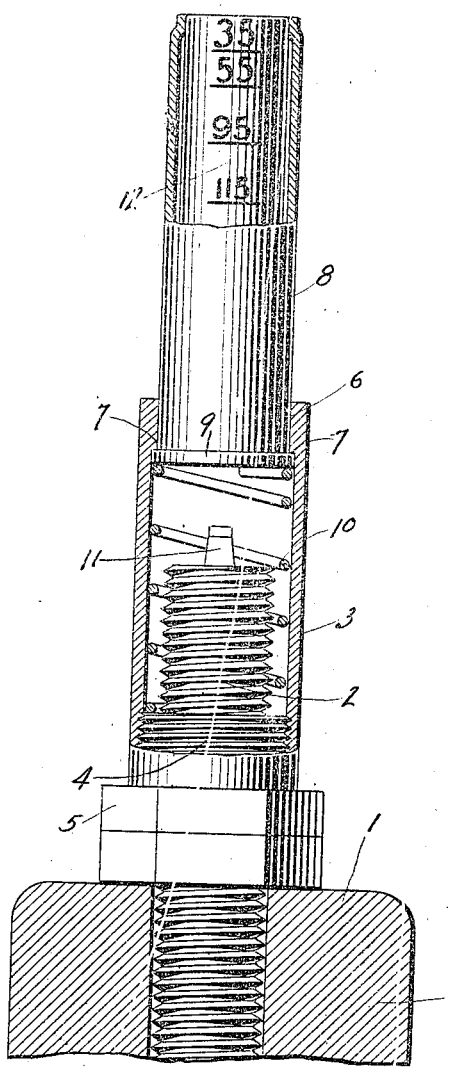
Figure 2:
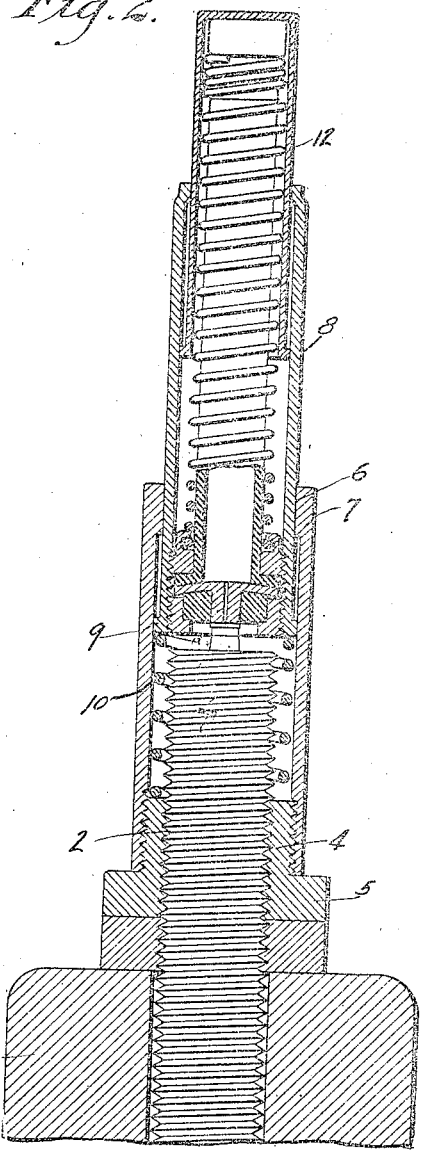

In the accompanying drawing, which illustrates one embodiment of the invention and wherein like characters of reference indicate corresponding parts in both the views, Figure 1 is a fragmentary sectional view of a vehicle wheel with the attachment applied to the valve stem thereof, portions of the attachment and gage being shown in section; and Fig. 2 is a similar view showing the gage and attachment in central longitudinal section.

Referring to the drawing, 1 designates the rim of a wheel, and extending through the rim is the usual valve stem 2 for a pneumatic tire (not shown) on the rim. The attachment comprises a tubular member or shell 3 which is internally threaded at its lower end to screw on a ring 4 which is internally threaded to screw on the valve stem 2, there being a hexagonal flange or equivalent portion 5 on the ring or bushing 4 to facilitate the application of the ring to the valve stem. The outer end of the shell 3 has an opening 6 and an internal shoulder 7. Slidable in the opening 6 is an ordinary pocket tire pressure gage 8, the flange 9 of which is normally held against the shoulder 7 by a helical compression spring 10 which seats against a bearing formed by the ring 4. The pressure gage is of usual construction, and in order to register the pressure of the tire it is merely necessary to press the gage 8 in a direction to press the spring 10, when the projecting part 11 of the valve will be engaged by the gage to cause the valve to open, whereby the barrel 12 of the pressure gage will be forced outwardly to indicate the pressure in the usual manner. When the gage 8 is released it is forced outwardly from the position shown in Fig. 2 to the normal position shown in Fig. 1. If the tire needs pumping up the attachment and gage are removed so that pump connections with the valve stem can be made, and then the attachment and gage are replaced and will be normally carried by the wheel, so that at any time the pressure of the tire can be ascertained simply by moving the gage to operative position with relation to the valve stem, as indicated in Fig. 2.

The details of the gage need not be described, as the gage shown represents a well-known patented gage now on the market.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claim.

Having thus described my invention, I claim as new and desire to secure by Letters Patent:

The combination of a pneumatic tire valve stem, with a combined cap and pressure gage comprising a tubular member surrounding and attached to the stem and provided with an internal shoulder, a pressure gage slidable axially of and located within the shouldered end of the tubular member and having an external flange adapted to engage with the internal shoulder of the tubular member, and a spring located within the tubular member and surrounding the stem, with one end bearing on the inner end of the gage to urge the same outwardly, a bearing being formed in the tubular member on which the other end of the spring bears, said spring being adapted to yield when the pressure gage is moved bodily inwardly into coöperative relation with the valve stem.

GEORGE B. MULLEN.